Oct. 21, 1958 W. W. SVENDSEN ET AL 2,857,138

CORE BARREL

Filed July 2, 1954 4 Sheets-Sheet 1

INVENTORS
WALTER W. SVENDSEN
JOHN C.C. BLAIR, JR.
BY
Paul Moore & Lugger
ATTORNEYS Oct. 21, 1958 W. W. SVENDSEN ET AL 2,857,138
CORE BARREL
Filed July 2, 1954 4 Sheets-Sheet 2

INVENTORS
WALTER W. SVENDSEN
JOHN C.C. BLAIR, JR.
BY
ATTORNEYS

Oct. 21, 1958   W. W. SVENDSEN ET AL   2,857,138
CORE BARREL
Filed July 2, 1954   4 Sheets-Sheet 4

INVENTORS
WALTER W. SVENDSEN
BY JOHN C.C. BLAIR JR.
ATTORNEYS

United States Patent Office 2,857,138
Patented Oct. 21, 1958

2,857,138

CORE BARREL

Walter W. Svendsen, St. Paul, Minn., and John C. C. Blair, Jr., Max Meadows, Va., assignors to E. J. Longyear Company, Minneapolis, Minn., a corporation of Delaware Application July 2, 1954, Serial No. 440,942

11 Claims. (Cl. 255—1.4)

This invention relates to core barrels useful in the art of drilling wells for oil, gas, sulfur and more especially in drilling exploratory holes for sampling subterranean formations in searching for mineral deposits and the like. More particularly this invention relates to cut-off means for shutting off the flow of the drilling fluid in the core barrel as a signal to the driller during the drilling operation and/or for automatically controlling the drilling operation.

In rotary drilling there is provided a flow of drilling fluid across the bit face for cooling the bit and for moving the cuttings away. The drilling fluid may be a liquid such as water or specially prepared aqueous or other liquid suspensions containing clay or the like, or they may be gases such as compressed air, nitrogen or other gaseous fluids. Liquids work best for most diamond drilling operations but where water is scarce, compressed air or other gases such as nitrogen may be used. For rotary bits using rolling cutters, compressed air or nitrogen gives excellent results when used as the drilling fluid.

In respect to this invention, the term "drilling fluid" will therefore be understood to be inclusive of liquid and gaseous fluids and dispersions.

In core drilling apparatus the drill bit may consist of an annular tube faced at one end with diamonds or other hard cutting material. The bit is the terminal end of a long tube known generally in the art as a "core barrel." Within the core barrel and forming a part of it there is a "core barrel inner tube" which receives the core. This is sometimes called "the inner tube." The core barrel is attached to the lower (or forward) end of a series of tubes, coupled together, which though tubular, are usually called "drill pipe" or "drill rod" or (collectively) the "drill string" or "drill stem." The term "drill stem" will be used herein.

As the bit rotates it cuts or grinds an annular groove in the direction of drilling, and the material so removed is washed away by the flow of drilling fluid which is forced down through the tubular "drill stem." The drilling fluid carries the drilled residue back up the hole outside the drill stem and to the surface where it may be collected for sampling. The object of core drilling is to obtain as much undamaged core as possible in the form in which it exists in the underground formation. Since the core barrel inner tube, in which the core is collected, is relatively short, provision must be made for periodic removal of said inner tube (together with such core as may be contained therein), and the core is then removed and placed in storage racks to allow determination of the nature of the formation through which the drill bit has passed. Cuttings may also be sampled and thereby assist in the complete appraisal of the underground formation. One hundred percent of core recovery is the desideratum but as a practical matter this is seldom attained, with equipment heretofore available, especially in broken or soft formations.

A principal type of core barrel presently in use is known as the swivel core barrel. In a core barrel of this type the core barrel inner tube, which receives the core as it is formed, is suspended within the core barrel outer tube by means of a set of bearings located in the head or upper end of the core barrel. This inner tube thus hung on bearings is freely suspended within the core barrel outer tube to receive the core as it is formed. As the core barrel outer tube carrying the bit rotates, the inner tube (being freely rotatable on its bearings) remains substantially stationary around the core, due to the drag on the core, and the core barrel inner tube slides down on the core as the core lengthens coincidental with penetration of the drill bit into the underground formation. Provision is made at the surface to force the drilling fluid down the center of the drill string and when the fluid reaches the core barrel the fluid flows down between the inner and outer core barrel tubes thence out across the bit face and up the outside of the core barrel and drill string and to the surface. Two types of swivel type core barrels are now in use, these being the so-called wire-line core barrel wherein the inner tube may be retracted through the drill stem and brought to the surface without the necessity of pulling the entire drill stem; another being the non-retractable type, which requires pulling the drill stem in order to obtain access to the core barrel and hence to the core.

It frequently happens that for one reason or another the entrance of the core into the core barrel inner tube is not smoothly accomplished. This is because the outer surface of the core is usually somewhat rough and not truly cylindrical, due to slight deviations from true axial direction which occur as the bit is progressed forwardly. Furthermore, the underground formations may be weak and may fracture or chip away, thus allowing slippage, between adjacent portions of the core along planes which are seldom normal to the axis of the core. Also, during field operations, the relatively thin core barrel inner tube may become dented or out of round or slightly bent. The result of these factors has been that many times, the core will become jammed in the core barrel inner tube long before the latter has become anyway near full of core. Then, further serious occurrences take place, as follows:

Since the drill bit cannot proceed further in the drilling direction due to the holding force provided against such movement by the jammed core, the bit gradually will cut itself free, thus relieving pressure on the bit. Meanwhile, the core holds the core barrel inner tube and the latter through its bearings, begins to provide support and finally may entirely support the entire drill stem which meanwhile is being rotated and fed in the drilling direction by the drill rig. Something finally fails, this being usually the bearings supporting the core barrel inner tube or the core barrel may be bent or warped. The core barrel inner tube will of course become solidly blocked by the excessive pressures imposed on the jammed core within it, and extraction of the core is next to impossible, especially without further damaging the inner tube.

It sometimes happens that the core will jam in the inner tube, and then as the pressure is forced onto the inner tube the core will slip a little, crush, or free itself. This allows the bit, which meanwhile has cut itself free or partially free, to be suddenly brought against the end of the hole with impact force and while rotating. This causes bit damage, breakage or loss of diamonds from the bit and general mal-functioning.

While some of the foregoing difficulties may be avoided or at least alleviated by the use of the non-rotatable mounted core barrel inner tube, other difficulties are imposed by so doing. Thus, if the inner tube is fixed to the core barrel outer tube (and hence rotates with the bit), the inner tube must spin around the core. Sometimes this keeps it free, but as often as not, it will aggravate fracturing and transverse slippage of the core. The result is hung cores with, in this instance, the "core" providing the "bearing"; and with at least some of the foregoing difficulties (bit trouble) just as much as before. Also, there is severe scouring and wear on the non-rotatably mounted core barrel inner tube.

To alleviate the foregoing difficulties, it is desirable to stop drilling and withdraw the bit immediately upon occurrence of jamming or blocking of movement of the core in the core barrel inner tube. Prompt action by the driller is the desideratum, for it is only by prompt action that further, more serious difficulty is avoided. Heretofore, the driller had to rely upon the most minute and not easily discernible indicia of drill functioning in his efforts to ascertain from the surface the functioning of the bit and core barrel hundreds or even thousands of feet away, and drillers have seldom been able to do this with regularity and infallibility.

The indicia relied upon by drillers are usually limited to sounds and vibrations given out by the drill rig during drilling. Each experienced driller comes to know his equipment and in his work develops to some degree, what one inexperienced in the art might consider a "sixth sense," at perceiving and alleviating the results of core blockage. Yet, upon questioning, a dozen good and experienced drillers will describe a dozen different modes of sensing the difficulty with the result that it is almost impossible to introduce inexperienced help into the art. Even more important than this is the fact that good and experienced drillers have a very high percentage of equipment and operation failures due to core blockage, or stated another way, there has not, prior to this invention, been developed a truly effective way by which even an experienced driller can infallibly detect core blockage during its inception and even severe core blockage can be detected only uncertainly.

It is the principal object of this invention to overcome the above recited disadvantages by providing means whereby the pressure used to supply the drilling fluid to the system may be used to indicate presence of blocking or jamming of the core barrel inner tube, and/or to control the drilling machinery in such a manner that the jamming will not cause increased damage to equipment or core sample.

It is a further object of this invention to provide an improved core barrel having a means for diminishing the flow of the drilling fluid at the core barrel as a means of increasing the fluid pressure in the drilling fluid system so that jamming of the core may be made known promptly as a means of correcting the fault, to the end that more core may be recovered without damage to core or equipment.

Another object of this invention is to provide a means whereby cores may be taken from soft and easily fractured formations without damage to the cores and to the drilling equipment.

Still another object of this invention is to provide means whereby the drilling operations may be stopped automatically upon the development of a condition of jamming or blocking of the core barrel inner tube before damage to the drilling equipment occurs.

A further object of this invention is to provide a core barrel having a fluid cut-off valve comprising a washer of resilient material capable of expanding and squeezing off or greatly diminishing flow of fluid to the drill bit at the onset of a condition of blocking or jamming within the core barrel inner tube.

A still further object of this invention is to provide a method for signaling to the driller and/or controlling the drilling machine at the surface for the purpose of stopping drilling operations when the core barrel inner tube becomes blocked or jammed.

Other objects of this invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by means of the drawings in which the same numerals refer to corresponding parts and in which.

Figure 9:
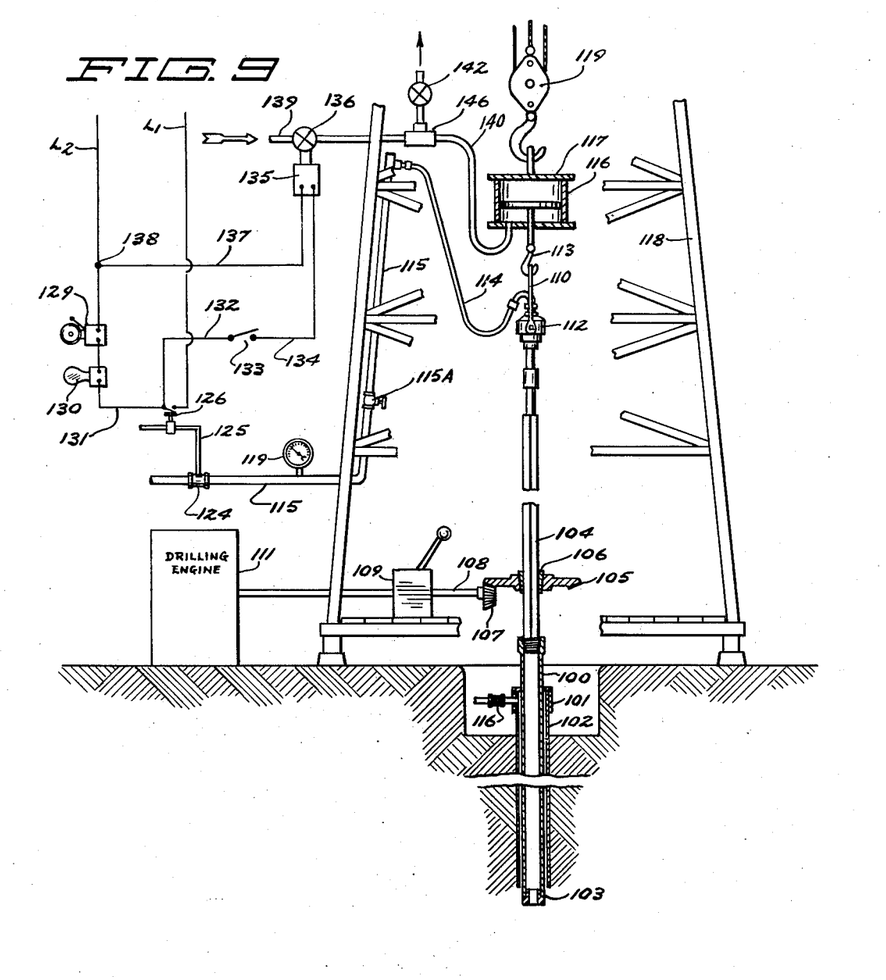
Figure 9 is a simplified schematic and diagrammatic view, partly in vertical section of an oil-field type drill rig of the present invention embodying automatic signalling and control apparatus located at and on the drilling machine.
Figure 10:
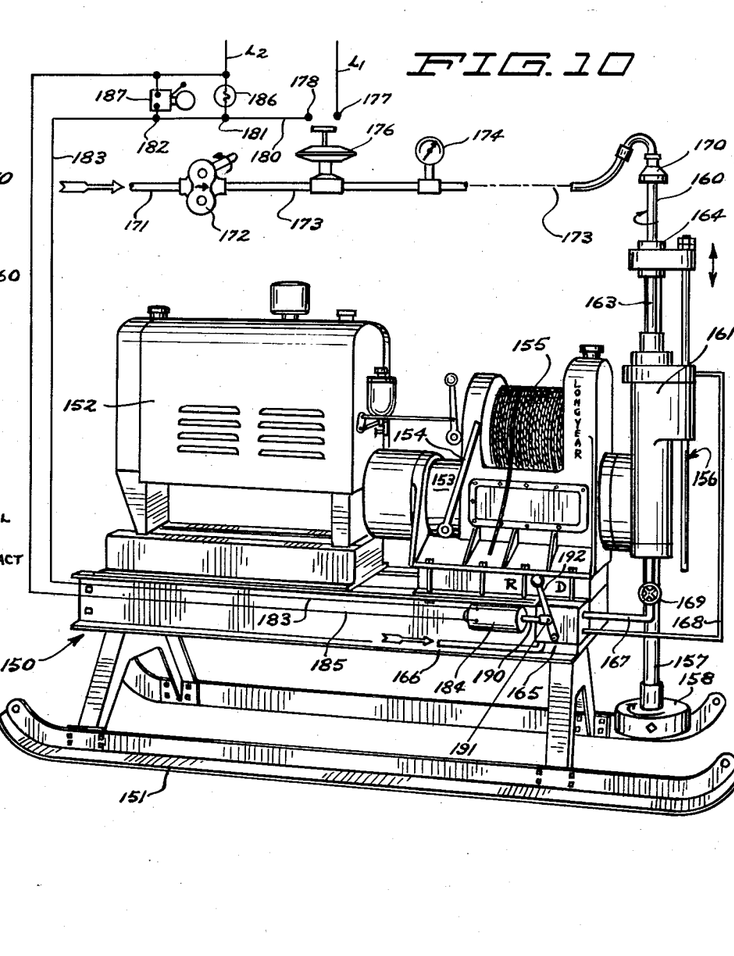
Figure 10 is a view partially perspective and partially schematic illustrating a core drilling machine embodying the signalling and control means of this invention.
Figure 11:
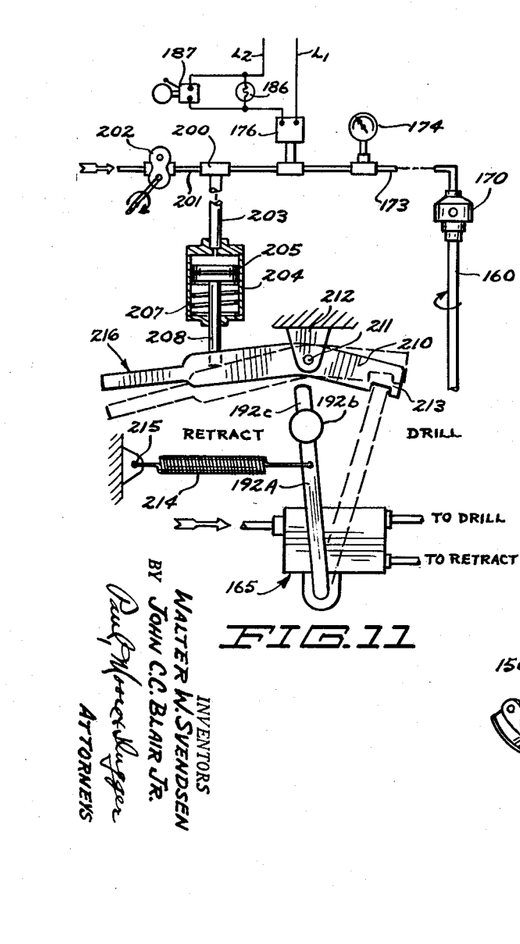
Figure 11 is a fragmentary schematic view of a slightly modified form of apparatus shown in Figure 10.

At the outset it may be stated that the present invention can be utilized with drilling equipment and coring tools of widely varying types and that the embodiments herein specifically shown and described should therefore be considered merely as illustrative. As some of the forms of core drilling apparatus which can be adapted to conform to the present invention, there may be mentioned so-called wire-line core barrel drilling equipment here illustrated in Figures 1 and 2; the ordinary swivel core barrel which is withdrawn by pulling the drill string, here illustrated in Figure 3 and the rigid core barrel, in which the core barrel rotates with the bit, here modified and illustrated in Figure 4. Diamond, hard metal set, or rotary cutter bits may be used. Figures 9, 10 and 11 illustrate several forms of signalling and/or control elements at the surface which are new and are made possible by and as a part of the present invention.

Figures 1, 3:
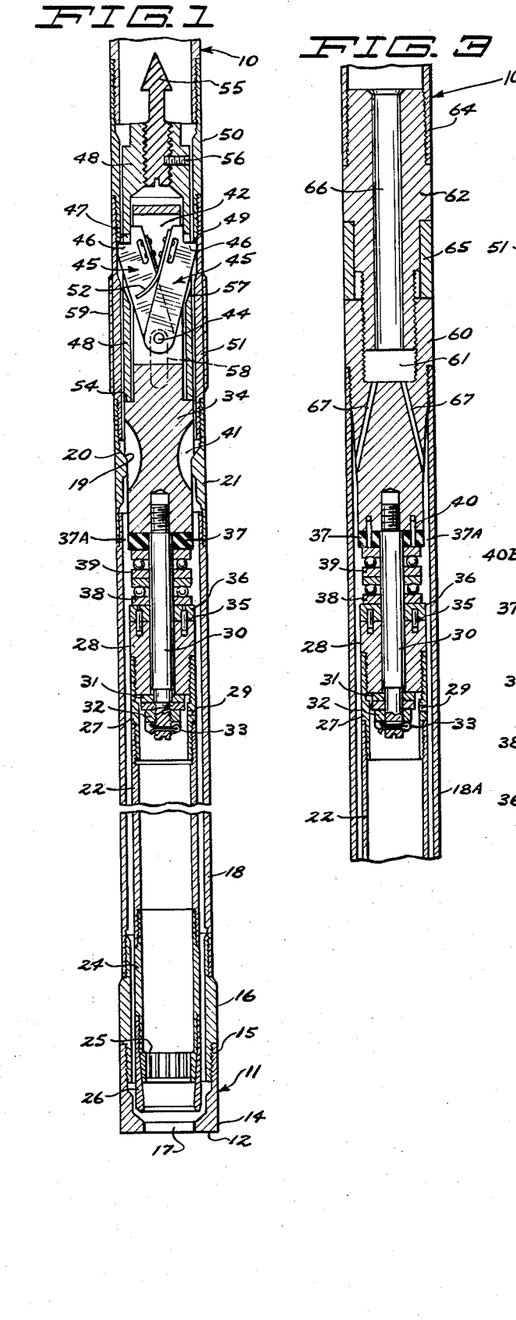
Figure 1 is a longitudinal sectional view of a core bit and a retractable wire-line core barrel embodying the fluid cut-off apparatus of this invention.
Figure 3 is a fragmentary longitudinal sectional view of a swivel type core barrel of the non-retractable type embodying the fluid cut-off apparatus of this invention.

Referring now to the drawings and particularly to Figure 1, the form therein illustrated is the retractable wire line core barrel which is comprised generally by a hollow drill tube 10 which is the lower end of the drill stem. This drill stem is made up of sections of tubing connected together by screw threaded couplings. To the lower end of drill stem 10 the core barrel assembly is attached.

The lowermost section of the core barrel terminates with a drill bit 11 and in the form here illustrated is a so-called diamond core bit, but it must be appreciated that other bits such as bits of the roller bit type, or hard metal set type may be used. In the diamond core bit, the cutting face is formed by the annular face 12 and sides 14 of the thickened bottom portion of the bit which are formed of or surfaced with hard facing material or material having diamonds embedded in the exposed surfaces. The drill bit 11 is threaded at 15 onto the reaming shell 16 which may have diamonds or other hard points on its outer surface, so as to ream to guage size the hole produced by the bit 11. The cutting face 12 of the bit is provided with a central aperture or opening 17 through which the core sample, as it is cut, enters into the core barrel inner tube 22—24—26 where it is received. The reaming shell 16 is in turn mounted by screw threads on the lower end of the outer tube 18 of the core barrel assembly at the bottom of the drill stem. The core barrel inner tube 22—24—26 fits loosely within the outer tube 18 of the core barrel assembly with clearance between them through which the drilling fluid flows to the bit face. The core barrel inner tube assembly consists, in the illustrated embodiment of Figure 1, of a main tube member 22 having a lower, renewable end piece 24 screw threaded onto it at the lower end and a connector tube 27 at the top. Then, below the end piece, there is provided the core lifter cage 26 which in some drilling equipment is made with a slide fit, where it engages the lower shoulder of end piece 24. In other equipment, the cage 26 is threaded onto piece 24 or even onto the lower end of tube 22, where the renewable piece 24 is omitted. The function of the core lifter cage 26 is to provide a seating for the core lifter 25. Different patterns of the core lifter assembly 25—26 may be employed for engaging and lifting the cores of various formations through which the drill passes. The core lifter assembly 25—26 per se forms no part of the present invention, save only as an element of the whole assembly. It is sufficient to say that the core lifter assembly is appropriate for gripping, breaking, and holding the core when the drill stem is backed off (or up), or the inner tube retracted.

In the illustrated core barrel of Figure 1, the outer tube 18 is threaded into a hanger coupling 21 which is in turn threaded into guide coupling 51, which may be provided with hard surfaced ridges on the outside for steadying it, as it rotates. The coupling 51 is threaded onto the locking coupling 50 which is, in turn, threaded onto the lower end of the drill stem 10.

The wire line core barrel mechanisms and assembly, per se, is fully described and claimed in the application of Albert Frank Pickard and Walter W. Svendsen, Serial No. 374,204, filed August 14, 1953, Patent No. 2,829,868, issued April 8, 1958. It consists, briefly of the following: Hanger coupling 21 is provided on its inner surface with a shoulder 20 upon which the corresponding shoulder 19 of the latch body 34 is adapted to seat. The lower exposed edge 49 of the locking coupling 50 provides a seat against which the shoulders 46—46 of latch dogs 45—45 are adapted to seat, in order to hold the latch dogs 45 and hence the latch body 34 in position against upward movement. The latch dogs 45—45 pivot on pin 44 through the latch body 34 and are normally urged outwardly by the latch dog springs 52—52. The latch body 34 has a reduced upper end diameter over which the lower tubular skirt end of the latch retracting case 48 is adapted to slide up and down with reference to the latch body 34 within the limits of the slots 58 which are cut in the skirt. Pin 44, which holds the latch dogs 45—45 is driven through the upper end of the latch body 34 and extends beyond the latter at each end and into slots 58 in the skirt of the latch retracting case 48. Pin 44 thus prevents the latch retracting case 48 from turning, but limited up and down sliding movement of the case 48 with reference to the latch body 34 is permitted. The latch retracting case 48 is slotted at each side to permit the latch dogs 45—45 to reach through and engage the lower exposed shoulder edge of locking coupling 50. These slots are chamfered at 57—57, and when the latch body 48 is pulled up with reference to the latch body 34, the dogs 45—45 are retracted inwardly, thus releasing the latch body so that it and everything connected to it can be retracted up through the drill stem. The upper end of the latch retracting case 48 has a threaded-in spearhead 55 which is held from turning by setscrew 56. A wire line grapple, as described in the aforesaid Svendsen and Pickard application is adapted to grip the spearhead and upon pulling, to release the dogs 45—45 and allow retraction of the latch retracting case 48, the latch body 34, and everything carried thereby can then be withdrawn through the drill stem 10.

It will be noted that the drilling fluid may pass readily through the drill stem 10, then downwardly through the clearance spaces around the latch retracting case 48 and the latch body 34, thence through slots 41—41 (so as to pass the shoulder seat 19—20) and to and through the clearance space around the lower end of the latch body 34.

Now, the lower end of the latch body 34 is threaded to receive the spindle 30 upon which the upper end of the core barrel inner tube is rotatably mounted. This is done by providing at the lower end of spindle 30 a castellated nut 32 held by cotter pin 33. Nut 32 holds washers 31 in place and these washers 31 form a lower bearing for the under (and inner) surface of the inner tube cap 28 of the core barrel inner tube. Since the force on the core barrel inner tube cap 28 is most always upward when drilling, the bearing provided by washers 31 need not be precise.

The upward thrust of cap 28 is taken through wear washer 36 of steel or bearing metal which is pinned at 35 to prevent rotation and then through one or more quality ball or other form of thrust bearings 38 and 39. Then, in the wire line core barrel as described in the aforesaid Svendsen and Pickard application, the thrust from the upper race of bearing 39 is then transmitted through another wear washer of steel or bearing metal to the under surface of the latch body 34. Accordingly, the core barrel inner tube would be journalled for rotation.

According to present invention, there is interposed above the uppermost bearing (here illustrated at 39) a relatively thick washer of a resilient composition which can be deformed to an increased diameter when it is axially compressed. Here, this element is the washer 37 which is composed of rubber composition or other resilient and compressible composition and of a desired hardness. Usually a rubber composition having a Durometer number of 30 to 60 will suffice, but softer or harder compositions may be used.

Figure 2:
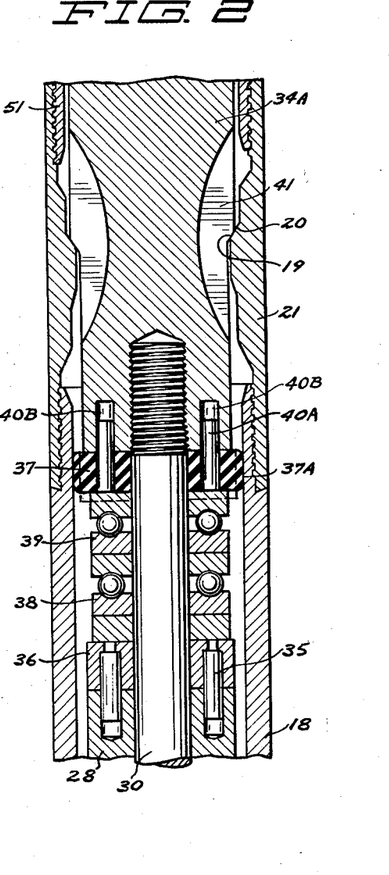
Figure 2 is an enlarged fragmentary longitudinal sectional view of a portion of a core barrel shown in Figure 1, showing the fluid cut-off valve under compressive load such as occurs when jamming occurs, with the cut-off valve operative to diminish or shut off the drilling fluid supply to the bit with consequent increase in pressure on the drilling fluid supply line.

Since the upper race of the upper bearing 39 does not turn, this resiliently deformable washer 37 is not subjected to any appreciable turning moment, and it is usually not essential to pin it against rotation, but this may be done as at 40A in Figure 2, or as at 40 in Figure 3. The substantially pure axial compressive force will serve only to deform the washer 37 axially and so increase its diameter and hence its girth. Thus, when jamming of the core within the core barrel inner tube 22 occurs, the inner tube 22 is held against downward sliding movement and also against rotation. Then, as the rotating bit penetrates forwardly, the feed pressure which is ordinarily carried by the bit, is gradually transferred as follows: The force from the drill stem 10 is passed through latch dogs 45, pin 44, latch body 34 to the upper surface of washer 37 which turns with latch body 34 and also with core barrel outer tube 18. The force is transmitted through resilient washer 37 to the upper race of bearing 39 (which also turns with washer 37) and finally through bearings 39—38, through wear washer 36 and cap 28 (which remain stationary) and to the core barrel inner tube 22 (which likewise is stationary) and thence to the core.

Washer 37 is thus captured and axially compressed and hence deformed. The resilient composition of which washer 37 is composed begins to expand in diameter due to its axial compression and hence closes the clearance space 37A (Figure 1) through which the drilling fluid had been passing at a steady volumetric rate, as determined by the drilling fluid feed pump used in the drilling set-up, and the ordinary resistance of the fluid passageways in the apparatus. As the space 37A is gradually restricted, the pressure essential to continuance of flow of drilling fluid will gradually increase until a maximum is reached when space 37A is closed off, as in Figure 2.

This increase in pressure of drilling fluid can quickly be recognized at the surface through the use of appropriate guages, pressure operated signals and/or automatic controls for the drilling machinery, and the driller is warned and/or the operation of the drill is automatically controlled to decrease feed, slow down or stop rotation of the bit or take such other remedial steps as may be desirable for the particular drilling operation being carried out. This is our discovery, and its full realization enables even the inexperienced driller to regularly accomplish results heretofore only occasionally obtainable by the long experienced driller.

It is important from the standpoint of wear that the periphery of the washer 37 and its opposite faces be not exposed to excessive motion relative to adjacent parts. Therefore, the washer 37 is placed in a location such that it is subjected to little or no rotation or motion relative to adjacent parts. This is accomplished in the herein disclosed illustrative embodiments. Thus, the washer 37 is seated between the bottom of the latch body 34 and the upper race of upper bearing 39. So long as bearings 38 and 39 hold out, there will be little or no drag on the upper race of bearing 39, and it will be free to rotate with washer 37, body 34 and tube 18, which of course, shall be turning when drilling. Hence, there is no shearing or wearing action imposed on the upper and lower faces of washer 37. Likewise, there is no relative motion between the edge of washer 37 and the inner surface of tube 18, hence, no wear shall occur on this edge even though it may be in contact with tube 18. Such wear as may occur on the edge of washer 37 is merely due to the wire-drawing effect of the fluid being valved, as is common in any valve seat and washer. It will be apparent that many of these advantages would be lost by locating the washer 37 below bearing 38.

Figure 2 is an enlargement of the structure shown in Figure 1, showing the washer 37 compressed as during blocking of the core in the core barrel inner tube. This figure also shows the washer 37 as being held against rotation by the pins 40A. This has some advantages, since it must be recognized that the upper race of bearing 39 may impose a slight turning moment on washer 37, even though the bearings 38 and 39 are working at best efficiency. It may be noted parenthetically that in most swivel core barrels, the bearings, here illustrated as bearings 38 and 39, work unlubricated in fluid (usually aqueous), which may include entrained abrasive or hard material. Hence, it is to be expected that bearing life for bearings 38 and 39 will be reduced, and that they will have to be replaced whenever they become worn.

Figure 3 illustrates the manner in which the valving washer 37 is applied to a common form of swivel core barrel assembly. This (Figure 3) form of core barrel is of the type which is removed from the hole by pulling the drill stem 10. It is not a wire-line core barrel. The structure is analogous to Figure 1, except that core barrel outer tube 18A is screwed onto coupling 60 which is in turn screwed onto the lower reduced end of coupling 62, with wear collar 65 interposed. The drilling fluid will here pass downwardly through the drill stem 10, through bore 66 of coupling 62, thence through space 61 and ports 67—67 to the clearance space 37A between the core barrel outer tube 18A and the core barrel inner tube 22 and its bearings. The swivel support of the core barrel inner tube 22 of Figure 3 is analogous to that shown and described with reference to Figures 1 and 2, it being noted that pins 40 are provided as at 40A in Figure 2. The action is likewise the same. Thus, when the core jams, the gradual transfer of load through bearings 38 and 39 causes compression and radial expansion of washer 37, thus throttling the flow of drilling fluid. Increase of pressure in the drilling fluid supply line at the surface reflects the increase in fluid pressure on all parts of the fluid system above the washer 37; i. e. in ports 67—67, place 61, bore 66 and in drill stem 10, and the driller is accordingly warned (by suitable guage, or pressure actuated alarm) so that the feeding of the bit may be stopped and the bit retracted (while rotation of bit is continued) or other remedial action taken, by pressure actuated automatic feed release and retraction operation.

Note that it is not usually desirable to stop rotation of the bit, although this may be done in some operations. What is desired is to release the feed, back off the bit (and hence release compression on washer 37); restore full flow of drilling fluid, all while the drill stem continues to spin. This prevents "settling" of entrained materials in the drilling fluid, which might occur if the bit were stopped rotating prior to flushing the hole and allows full maneuverability of the bit and stem to be maintained. This is accomplished as herein stated.

In the early type of rigid core barrel, the core barrel inner tube was made simply as a tube removably attached to, but located within the core barrel outer tube, with clearance between to allow flow of drilling fluid. Both inner and outer tubes were fastened so as to rotate together. There are some advantages in this early form of core barrel, and many old-time drillers continue to use them. Such advantages as this early form of core barrel may have for those who want to use them are preserved, and the automatic signalling and/or control features of the instant invention are additionally gained in the illustrated form of the invention shown in Figure 4. In this figure, drill stem 10 terminates at coupling 62A and connects to head-coupling 70 of the core barrel, with wear collar 65A interposed between. The head-coupling 70 has a square (or other non-circular, cross-section) axial opening through it for axially slidably receiving the correspondingly shaped shank 72 of the cap 71 which is attached to and supports the core barrel inner tube 22A. Core barrel outer tube 18A is threaded onto the lower end of coupling 70. Ports 77—77 permit passage of drilling fluid from stem 10, through axial bore 66A, space 76, ports 77—77 to the clearance space between portion 71 of the core-barrel inner tube head support and the inner surface of tube 18A. Shank 72 is reduced and threaded at 74 and is held assembled by nut 75.

Figure 4:
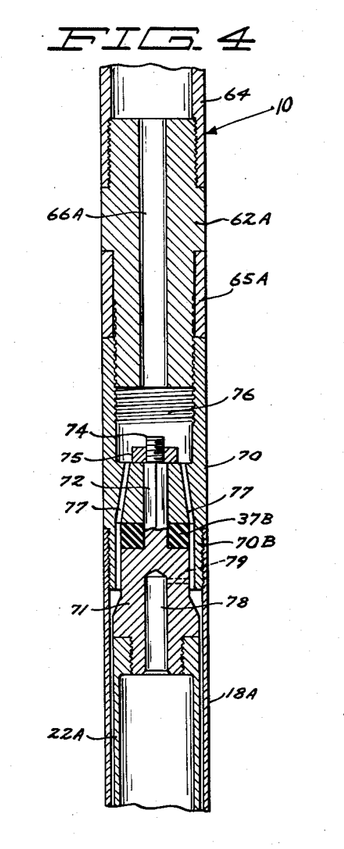
Figure 4 is a fragmentary longitudinal sectional view of a form of rigid core barrel modified according to the present invention so as to permit embodiment of a fluid cut-off valve apparatus.

Now it will be observed that with the elements of the core barrel so constructed, any lifting (or supporting) force axially of core barrel inner tube 22A toward the drill stem 10 will cause shank 72 to slide in its axial socket within coupling 70. This tendency towards movement is resisted by the interposition of resilient washer 37B which provides a certain resistance against such axial displacement, as determined by the inherent resiliency of the washer 37B. However, as the core blocks and resists movement of tube 22A in the direction of drilling, a force is imposed axially upon washer 37B and it is axially compressed and hence radially expanded until finally the rim of washer 37B will engage against the inner cylindrical surface of the skirt 70B of coupling 70, thus restricting flow of drilling fluid through this zone. As a result, the pressure on the fluid supply line, i. e. in drill stem 10 to the surface will increase and by suitable signal or automatic device at the surface the increase in pressure may be used to signal the operator and/or to stop the feed and retract the bit or to stop bit rotation, as desired.

The resilient washer component, here illustrated as washer 37, Figures 1, 2, and 37B of Figure 4 may be formed of natural or synthetic rubber composition. It is preferred to form the resilient washer of a modified or synthetic rubber type material which is more capable of withstanding the destructive effects of oils and greases, since a certain amount of such materials may be present in the drilling fluid. The material of which the resilient washer may be formed, may for example, be neoprene, the long chain synthetic rubber made by the polymerization of mono-chloro-butadiene; Buna N, the synthetic rubber formed by copolymerization of butadiene and acrylonitrile; Buna S, a butadiene-styrene copolymer; rubber hydrochloride; vinyl chloride polymers and other similar rubber and rubber-like materials. The rubber compositions used in making the resilient washer (37 or 37B) may be made of various degrees of hardness so as to be susceptible to light, medium or heavy blocking pressures. It is sometimes desirable to be able to apply some pressure in an attempt to cause the core to loosen and slip. Varying underground formations require differing treatments. Usually synthetic or natural rubber compositions, having a Durometer number of 30 to 60 will suffice for construction of the resilient washer, but softer or harder compositions may be used.

Referring to Figure 2 in which the resilient cut-off washer 37 is provided with holes for receiving retaining pins 40A, it may be noted that pins are longer than the holes in the latch body 34A in which they rest and thus extend into the corresponding holes in the washer 37. The pins serve not only to prevent relative rotation of the washer, but also to limit the movement of the bearing structure and the inner tube assembly against the head 34A. Thus, pins 40A go entirely through the holes that are molded in the washer 37 and rest against the upper surface of the upper race of bearing 39, but the pins, while extending into appropriately placed holes 40B in the member 34A, are provided with end clearance in the holes 40B, when the washer 37 is not compressed axially. The pins 40A are lose enough to slide in holes 40B, but are snugly held by the washer 37. Hence, when washer 37 is not axially compressed, i. e., as shown in the dotted line position of Figure 2, or as shown in Figure 3, the pins 40A retract a little endwise out of holes 40B, but when the washer 37 is axially compressed, the pins 40A will bottom in holes 40B and hence limit further compression beyond a certain degree, as shown in Figure 2. This feature may be used to prevent the washer from completely obstructing flow of the drilling fluid when the washer is compressed.

It may be noted that the bulk and size of washer 37 may be made such that in such fully compressed condition (as determined by the pins 40A) the edge of the washer 37 will either close off completely or close to a prescribed minimum the clearance space between the edge of the washer 37 and the inside of tube 18, through which the drilling fluid passes. Thus, if desired, a certain minimum flow of drilling fluid can be maintained to keep the bit cool and the fluid moving albeit requiring increased pressure on the drilling fluid supply line to do so. The pins 40A prevent resilient member 37 from being squeezed out into the space between the head 34A and the bearings 39 and against outer tube 18 by the tremendous pressures exerted upon the washer by the weight of the drill string upon occurrence of a severe block or jam. This is a possible result of the driller failing to heed the warning signal of increased drilling fluid pressure when automatic control is not used. The limit pins 40A may be incorporated in any of the resilient washers herein described, as conditions warrant.

Figure 5:
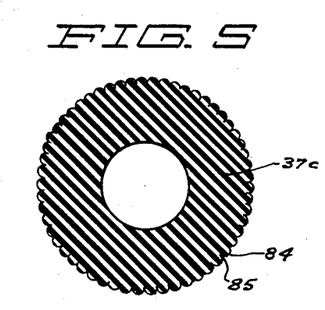
Figure 5 is a transverse sectional view of a fluid cut-off valve element according to an alternative form of construction within the purview of this invention.
Figure 6:
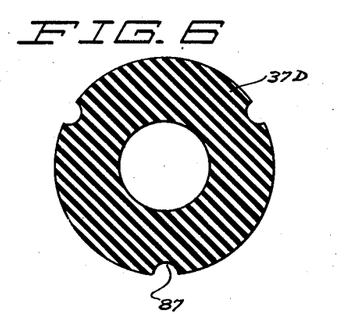
Figure 6 is a transverse sectional view of another alternative form of fluid cut-off valve element of the invention.
Figure 7:
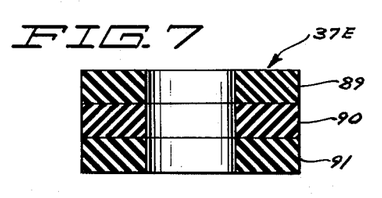
Figures 7 and 8 are elevational sectional views taken through fluid cut-off valves of two other alternative forms of construction.

In Figures 5, 6 and 7 there are shown several alternative forms of construction of the resilient rubber or rubber-like fluid or gas cut-off valve washer (designated 37 in Figures 1, 2 and 3 and 37B in Figure 4). The constructions to be described with reference to Figures 5, 6 and 7 permit of gradually diminishing cut-off of the drilling fluid in order to prevent damage to the drill bit due to lack of lubrication and cooling while the bit is being retracted, or the drilling operation is otherwise corrected to alleviate the core jam condition. Resilient washer 37C in Figure 5 is formed with a plurality of axial ridges 84 and valleys 85 in its outer periphery. As pressure is applied to this type of washer, the spaces in valleys 85 permit a certain minimum flow of fluid or gas even after the tops of the ridges 84 begin to press against the inner walls of the core barrel outer tube or the inner walls of coupling 70, as shown in Figure 4. The fluid pressure in the drill stem builds up, however, and transmits the warning to the surface. As the pressure exerted by the core increases, the flow of drilling fluid is gradually diminished, or if drilling is continued, it can be completely shut off.

The resilient washer 37D shown in Figure 6 has a plurality of axial grooves 87 spaced around its outer periphery. These grooves form channels through which a greatly diminished flow of drilling fluids may pass to the bit while at the same time causing the pressure of the drilling fluid within the drill stem to increase and warn the operator of the occurrence of blocking in the core barrel inner tube assembly.

Figure 7 illustrates still another form of fluid or gas cut-off element. This valve member 37E comprises a plurality of washers 89, 90 and 91 laminated together, the washers being formed of materials of different resiliencies. Thus, for example, washer 89 may have the least resiliency, washer 91 the most, and washer 90 may be of intermediate resiliency. As pressure is applied, it will first be absorbed by the most resilient section, but before this section has been expanded sufficiently to cut off the fluid or gas flow and before its elastic limit has been reached, the intermediate washer will begin to absorb the pressure, and so on until the entire element 37E is gradually expanded to gradually shut off the fluid or gas flow.

Figure 8:
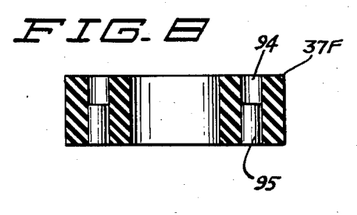

A further form of means for limiting relative axial movement between the lower inner tube assembly and the head is shown in Figure 8. The valve member 37F is provided with a plurality (usually 2 or 3) holes 94 into which are fitted steel pins 95 which are shorter in length than the thickness of resilient element 37F so that in use, upon occurrence of a jam or block, the pins will hold the bearings apart from the head and prevent the washer from extruding out into the core barrel outer tube more than is necessary to accomplish the shut-off of drilling fluid. The length of the pins would preferably be of the order of one-half the thickness of the resilient member or slightly more than one-half in order to permit sufficient expansion to shut off the drilling fluid, but insufficient to force all the washer out into the core barrel outer tube. The form of construction shown in Figure 8 is a variant of the construction shown in Figure 3.

In Figures 9, 10 and 11 there are illustrated several forms of automatic controls and signalling devices which may be utilized at the surface for signalling to the driller that jamming of the core has occurred, and/or for automatically retracting the bit or otherwise alleviating the core jam condition. In Figure 9 there is illustrated an apparatus which is best adapted for oil field drilling operations using roller bits and a gas as the drilling fluid, although as previously explained, liquids may be utilized if so desired. In Figure 9 the hole is provided with a casing 102 which is capped at 101. A pipe controlled by valve 116 carries the return drilling fluid and any entrained solid matter from the top of the casing to the sump in which it is collected for reuse if desired. Through the cap 101, which is a gland, there extends the drill stem 100 which is hollow and extends down to the drill bit at 103. The drill bit attaches to a core barrel of any of the types heretofore described in which a resilient washer is provided for gradually restricting the passage through which the drilling fluid passes to the bit face from the interior of the drill stem 100.

Above the gland 101, the drill stem 100 is connected to a kelly 104 here illustrated as a hollow square shaft which is screwed into the upper end of the drill stem. The kelly is arranged to be rotated by a bull gear 105 which in the illustration is rotated by pinion 107 from the shaft 108. The shaft 108 is driven through a suitable clutch and gear box 109 from the drilling engine 111. The method and apparatus for driving the kelly 104 may, of course, be suited to the convenience of the operator. At the upper end of the kelly 104, there is provided a water swivel 112 which is provided with a bale 110 by which it is held in an elevated position by the lower end of a hook 113 carried by the piston 116 of a hydraulic cylinder 117. The hydraulic cylinder is provided with an eye by which it is suspended from the block 119. The block, in turn, is suspended from the top of a derrick 118. The cylinder 117 is of very short stroke and of comparatively large diameter capable of lifting the drill stem. Ordinarily, the piston 116 is pulled downwardly by the hook 113 attached to the water swivel and the block is let off appropriately while applying drilling pressure. In this operation, the weight of the drill stem is more than should be applied to the bit, and part of the weight is taken by the tackle 119 which is let off as required. At other times, the block may be held just slack. The drilling fluid is supplied to the water swivel by means of the line 114 connected through the pipe 115 to a suitable supply line. The pipe may be provided with a valve at 115A. Adjacent the station occupied by the driller, there is ordinarily provided a gauge 119 by means of which the driller can observe the pressure in the drilling fluid supply line. In this instance, due to the action of the resilient washer such as washer 37 in Figure 1 or the corresponding fluid cut-off washers in the other views, the gauge serves an additional function, for as the resilient washer begins to close off the passage through which the drilling fluid passes, the pressure will increase at gauge 119 and hence warn the driller of the inception of a jamming condition within the core barrel.

In addition, from junction 124 in supply line 115 there is provided a line 125 leading to a pressure actuated switch 126. The switch is of the type which is normally open when pressure in line 115 is normal, and it is adjusted so that it closes at a predetermined pressure indicative of the condition of blocking or jamming of the core barrel. A circuit extends from line L1 of a power supply to one terminal of the pressure actuated switch 126 and thence through line 131 through a signal lamp 130, a signal bell 129 and thence back to line L2. From line 131 the circuit also extends over line 132 and through a manually controlled switch 133 and line 134 to the solenoid 135 of a normally closed solenoid actuated valve 136 and thence from the solenoid via line 137 back to junction 138 on line L2. Hydraulic pressure is constantly supplied to the inlet 139 of the valve 136, but since the valve is normally closed (when solenoid 135 is de-energized), no pressure is exerted through line 140 which is connected to the piston head of the cylinder 117. When the valve 136 is open, hydraulic pressure is exerted against the underside of the piston 116 to lift the drill stem. Therefore, normally the piston 116 rests downwardly against the cylinder head, but when the solenoid 135 is energized due to excessive pressure in line 115 closing the pressure actuated switch 126, the valve 136 is then open and pressure from line 139 is exerted through line 140 to the underside of piston 116, thereby causing the piston to be raised slightly. Since the tackle 119 is always kept tight or at least snug, the elevation of the piston 116 will cause the water swivel 112, kelly 104 and drill stem 100 all to be raised, thus withdrawing the bit 103 from the bottom of the hole and also relieving the pressure upon the jammed core. The release of pressure on the jammed core will in most cases permit the resilient washer 37 of Figure 1, or the corresponding washers of the remaining figures, to be relieved, thereby again reducing the pressure in the drilling fluid supply line 114. When this happens, the pressure actuated switch 126 may then open and the solenoid 135 will in that case be de-energized. This does not, however, set the system into oscillation and lower the piston 116, since the valve 136 merely again closes and consequently traps the oil in the hydraulic line 140 leading to cylinder 117 which has already elevated the piston 116. When the operator desires again to lower the piston 116 after relieving the jammed condition in the core barrel, he opens the lead valve 142 which extends from line 140 to the sump of the hydraulic system. The mechanism described accordingly permits the driller to observe by the gauge 119 the pressure in the drilling fluid system as an indication of jamming the core barrel. If the driller should miss the indication, a more forceful warning is provided by the bell 129 and light 130. Automatic operation may be achieved by closure of switch 133, whereupon the aforesaid operation of the automatically controlled lift of the bit via the cylinder 117 will be achieved. The hydraulic cylinder may alternatively be attached to the dead end of the cable.

In Figure 10 there is illustrated a drill rig of the diamond core drill type. The drill rig generally designated 150 consists of a portable platform 151 upon which there is mounted an engine 152, gear box and clutch 153 controlled by the lever 154, power actuated winch 155 and drill head 156 together with necessary auxiliaries. The drill head is provided with a suitable internal mechanism for rotating the drive rod 157 having the safety chuck 158 thereon. The drive rod is hollow and through it passes the drill stem of which the upper portion is shown at 160. Movement of the drill stem 160 upwardly or downwardly is controlled in this instance by the hydraulic cylinders 161 which operate through a pair of pistons 163, one on each side, which apply their hydraulic force through the thrust bearing head 164 attached to the drive rod. The hydraulic cylinders are the feed cylinders and the pistons 163 may be moved upwardly or downwardly, depending upon the setting of a control valve, generally designated 165. The control valve has a control lever 192 movable to two positions. A position "D" is the drilling or feeding position, and a position "R" is the retracting position. Hydraulic pressure is supplied to line 166 and thence, according to the position in which lever 192 of valve 165 is in, the pressure will be applied either through the line 167 or the line 168. A "feed control" valve is provided at 169 in line 167 for throttling the outflow of oil under the pistons when the pressure is applied above the pistons for forcing them downwardly, i. e. in the direction for feeding the drill during the drilling operation. Thus, by the controlled release of oil under the hydraulic feed pistons and back to the sump of the hydraulic system, the driller, by operation of valve 169 can control the rate at which the drill stem is fed during rotation of the bit.

In other drilling equipment, the feed may be of mechanical character and for applying the present invention, it is of little consequence whether the feed is mechanical or hydraulic, so long as suitable accessible controls are provided for manipulating the feed mechanism to the drilling and retracting positions. Thus, Figure 10 is illustrative.

In Figure 10 a water swivel is provided at 170 attached to the upper end of the drill stem 160, and drilling fluid is pumped from the sump via line 171, pump 172, and line 173 to the water swivel 170. A pressure gauge at 174 is provided in this line and a pressure actuated switch is provided at 176. The switch has a pair of normally open contacts 177 and 178 which are closed when the pressure in line 173 becomes excessive as occurs when the drilling fluid control washer in the core barrel is axially compressed and throttles or closes off the flow of drilling fluid, all as previously described. The electrical circuit extends from line L2 through contacts 177 and 178 to line 180 and thence through junction 181, junction 182 and line 183 to one terminal of a solenoid 184. From the other terminal of the solenoid a line 185 returns to line L2. From junction 181 a signal lamp 186 is connected to line L2 and from junction 182, a signal bell 187 is likewise connected to line L2. Consequently, when the pressure actuated switch 176 is actuated by an increase in pressure in the drilling fluid supply line 173, the lamp 186 and bell 187 will be actuated. Likewise, solenoid 184 will be actuated. The solenoid 184 has a solenoid core 190 which is pivotally attached at 191 to the control valve 165. Ordinarily, during the time that the solenoid 184 is de-energized, core 190 will move freely within the hollow interior of the solenoid coil. Accordingly, the operator can move the handle 192 freely to the "D" position, which is the drilling or feeding position. At this time the core 190 is retracted from the interior of the solenoid winding 184. When the winding 184 is energized, as occurs when switch 176 is closed, due to the jamming of the core, the core 190 of the solenoid will be quickly retracted into the solenoid core, hence moving the valve control lever 190 to the "R" or retracting condition. When this occurs, hydraulic pressure from the line 166 is applied to the line 167 and causes the pistons 163 of the hydraulic feed control cylinders 161 to be raised, thereby withdrawing the drill stem 160 to its uppermost condition. When the cylinders 161 and their pistons have been fully actuated, the bit will be withdrawn from the bottom of the hole by a distance equal to all or a part of the stroke of the pistons 163 in their cylinders, which is sufficient to relieve pressure due to any jamming on the core within the core barrel. The driller may then take remedial measures.

In Figure 11 there is illustrated another somewhat modified form of automatic control together with appropriate signals in which the pressure of the drilling fluid supply line is used directly for moving the appropriate core drill controls. The apparatus of Figure 11 is particularly applicable where an independent and infallible source of power for actuation of the solenoid of 184 to Figure 10 would not be available. In Figure 11, the water swivel 170 at the upper end of the drill stem 160 is connected as in Figure 10 through line 173, gauge 174 and pressure actuated switch 176, and thence through junction 200 to line 201 which is connected to the pump 202 by which the hydraulic fluid is supplied to the drilling system. In the apparatus of Figure 11, the electrical supply lines L1 and L2 may be low power battery lines and hence the signals 186 and 187 merely low voltage signals. However from the junction 200 on the drilling fluid supply line a pipe extends at 203 to a cylinder 204 having the piston 205 therein. The cylinder is provided with an internal spring at 207 by means of which the piston 205 is normally moved to the upper end of the cylinder against normal drilling fluid pressure, as illustrated in the drawing. The piston rod 208 normally protrudes only a short distance from the cylinder and the whole cylinder is mounted permanently on the machine frame.

Adjacent the control lever 192A of hydraulic control valve 165 (which is also described with reference to Figure 10), there is mounted a detent lever 210 which is pivoted at 211 on a bracket 212 attached to the machine frame and has an operator control handle 216 at the opposite end and is positioned so as to be within the stroke path of piston rod 208. The lever has a notch 213 in it, and in this instance, the control lever 192A of the valve 165 has a knob 192b set at the side and a protruding end 192c which is adapted to snap into the notch 213 when the right-hand end of the lever 210 is "down," as shown in Figure 11. In the drilling operation, the driller moves the handle 192A to the "drill" position. In doing so, he stretches the spring 214 which is attached to an eye in the lever 192A and is anchored at 215 on the machine frame. The lever 192A must then be held in the "drill" position, and this is accomplished by locating its upper end 192C in the notch 213 of lever 210 which is moved by the driller to the detaining position shown in full lines. Thereafter, so long as the drilling operation is progressing satisfactorily, the lever 192A will be held by the lever 210. As stated, the left end of lever 210 is positioned so as to be within the path of movement of piston rod 208 when it is actuated by an excessive pressure in the drilling fluid supply line 173 as occurs when blocking or jamming occurs in the core barrel all as previously described. Therefore, should jamming occur, the flexible fluid control washer in the core barrel is actuated and the pressure builds up in line 173. The piston 205 will then be moved downwardly and finally reach a position where it moves the detent lever 210 counter clockwise sufficiently to release the end 192C of the control lever 192A of valve 165 from its position within the notch 213. When this occurs the spring 214 quickly retracts the valve lever 192A to the full line position shown in Figure 11, and the drill stem 160 is then retracted by the hydraulic cylinders 161, all as previously described with reference to Figure 10.

While the present invention, insofar as it is applicable to swivel core barrels of the retractable wire-line type, is described and illustrated with reference to a particular retractable wire-line barrel which is the subject of the copending application, Serial No. 374,204, filed August 14, 1953, it is to be understood that the principles of this invention can be utilized in other wire-line core barrels.

It is apparent that many modifications and variations of the invention as hereinbefore set forth may be made without departing from the spirit and scope thereof, the specific embodiments described are given by way of example only, and the invention is limited only by terms of the appended claims.

We claim as our invention:

1. A core barrel comprising an outer tube having a coupling at one end and a coring bit at the opposite end, a core receiving tube having an outer diameter slightly less than the inner diameter of the outer tube, said inner tube being nested within the outer tube so as to provide a fluid passage clearance space between them, said inner tube extending from adjacent the bit to adjacent the coupling, an annular mounting fitting in the end of said inner tube adjacent the coupling, said coupling being formed with a fluid passage extending through the coupling and leading to the fluid passageway clearance space between said tubes, an axial mounting shaft connecting the coupling and the annular mounting fitting of the inner tube, mounting the inner tube for limited axial movement relative to said outer tube, said coupling and fitting having cooperative spaced opposed annular surfaces respectively thereon and a resilient fluid control washer positioned between said spaced opposed mounting surfaces and substantially filling said space axially, said washer having a diameter less than the inner diameter of said outer tube and being capable, when axially compressed of expanding in girth when the inner tube is moved towards said coupling for closing against said inner tube to close said fluid passage clearance space.

2. The core barrel set forth in claim 1 further characterized in that on said axial mounting shaft there is included a thrust bearing having a race which is normally non-rotatable relative to the outer tube and said race constitutes one of said annular mounting surfaces and said resilient fluid control member is supported on said shaft between said race and the cooperating annular mounting surface on said coupling.

3. The core barrel described in claim 1 further characterized in that said washer is of rubber composition.

4. The core barrel described in claim 1 further characterized in that said washer has convolutions around its periphery.

5. The core barrel described in claim 1 further characterized in that said washer comprises a plurality of layers of varying resiliency.

6. The core barrel described in claim 1 further characterized in that means is provided for limiting axial compression of said resilient washer.

7. The core barrel described in claim 1 further characterized in that means is provided for keying said resilient washer against rotation relative to adjacent surfaces while it is resiliently compressed.

8. The core barrel of claim 6 further characterized in that said means for limiting are solid stops between said mounting means and said race.

9. A core barrel comprising an outer tube having a coupling at one end and a coring bit at the opposite end, a core receiving tube having an outer diameter slightly less than the inner diameter of the outer tube, said inner tube being nested within the outer tube so as to provide a fluid passage clearance space between them, said inner tube extending from adjacent the bit to adjacent the coupling, said coupling being formed with a fluid passage, a journal pin connecting the inner tube and said coupling, said pin extending axially of the coupling, a thrust transmitting assembly on said pin for transmitting thrust from the inner tube to said coupling, said thrust assembly including an annular face which normally rotates at the speed of said coupling, a thrust washer on said journal pin between said face and said coupling, said thrust washer being radially expandable when it is axially compressed, said thrust washer being normally rotatable at the same speed as said outer tube, said thrust washer being of a size such that with the interior surface of said outer tube it normally defines a clearance space forming a fluid passageway connection between the fluid passageway of said coupling and the fluid passageway clearance space between the inner and outer tubes, said thrust washer being of a resiliency such that when it is axially compressed by a thrust load imposed by said inner tube towards said coupling said thrust washer will be radially expanded at least partially to restrict said fluid passageway connection.

10. A core barrel comprising an outer tube having a coupling at one end and a coring bit at the opposite end, a core receiving tube having an outer diameter slightly less than the inner diameter of the outer tube and nested within the outer tube so as to provide a fluid passage clearance space between them, said inner tube extending from adjacent the bit to adjacent the coupling, said coupling being formed with a fluid passageway extending therethrough and communicating with said fluid passageway clearance space between said tubes, a journal pin extending axially from said coupling toward said inner tube, a plurality of thrust bearings on said journal pin, means for mounting the inner tube on said journal pin for rotation and for limited axial movement relative to said coupling while in thrusting relationship against said thrust bearings, said thrust bearings including at least one race which is normally non-rotatable with reference to the outer tube, a resilient washer disposed between said race and said coupling, said washer having an outer diameter slightly less than the inner diameter of said outer tube such that with the inner surface of the outer tube it forms a fluid passageway connection from the fluid passageway of said coupling to said fluid passageway clearance space between said tubes, said washer being sufficiently resilient so as to be radially expansible when it is axially compressed for restricting said fluid passageway connection.

11. A core drilling apparatus comprising a hollow drill stem extending from the earth's surface into a hole drilled into the earth and having a rotary core bit at the end thereof and a core receiving core barrel immediately adjacent the core bit, motor means at the surface connected in driving relation in respect to the stem for rotating the stem, power means at the surface for moving said stem in the drilling direction and for retracting the stem including a control which, when actuated will retract the stem at least a limited distance from the bottom of the hole, fluid pressure means at the surface including a pressure line connected to the drill stem for forcing a drilling fluid through the stem and across the bit face, resilient fluid control means adjacent the bit end of the drill stem for restricting the passage of drilling fluid from the stem to and across the bit face when a core jams in the core receiving tube, pressure responsive means at the surface connected to said pressure supply line, a responsive device actuated thereby connected to said power means control for moving it to stem retracting condition when the pressure in said pressure line increases beyond a prescribed amount, a control which when actuated in one direction will cause the stem to be moved in the drilling direction and when actuated in the opposite direction will cause the stem to be retracted from the bottom of the hole, said responsive device being connected to said control for moving it to a condition to cause retraction of the stem when said responsive device is energized and a detent for holding the control in the position wherein the stem is moved to a drilling direction, said pressure responsive device including means connected to the pressure line for moving said detent to release said control when the pressure in the line reaches a predetermined amount.

References Cited in the file of this patent

UNITED STATES PATENTS

| | | |
|---|---|---|
| 1,883,960 | Koppel et al. | Oct. 25, 1932 |
| 2,159,640 | Strom | May 23, 1939 |
| 2,167,991 | Oliver | Aug. 1, 1939 |
| 2,182,251 | Crickmer et al. | Dec. 5, 1939 |
| 2,260,320 | Hoffoss | Oct. 28, 1941 |
| 2,532,716 | Havlick | Dec. 5, 1950 |
| 2,612,953 | Morgan et al. | Oct. 7, 1952 |